(12) United States Patent
Abedini et al.

(10) Patent No.: US 11,251,893 B2
(45) Date of Patent: Feb. 15, 2022

(54) SUPPORTING HIGH SPEEDS IN VEHICLE-TO-VEHICLE COMMUNICATION

(71) Applicant: QUALCOMM Incorporated, San Diego, CA (US)

(72) Inventors: Navid Abedini, Raritan, NJ (US); Libin Jiang, Bridgewater, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/365,384

(22) Filed: Nov. 30, 2016

(65) Prior Publication Data

US 2017/0273128 A1    Sep. 21, 2017

Related U.S. Application Data

(60) Provisional application No. 62/311,057, filed on Mar. 21, 2016, provisional application No. 62/331,754, filed on May 4, 2016.

(51) Int. Cl.
*H04J 13/00* (2011.01)
*H04W 4/46* (2018.01)
(Continued)

(52) U.S. Cl.
CPC ............ *H04J 13/0062* (2013.01); *H04L 1/00* (2013.01); *H04L 1/0001* (2013.01);
(Continued)

(58) Field of Classification Search
CPC ... H04L 5/0069; H04L 5/0051; H04L 5/0044; H04L 5/0055; H04L 1/0009;
(Continued)

(56) References Cited

U.S. PATENT DOCUMENTS

2011/0190972 A1\* 8/2011 Timmons ............... G08G 1/166
                                                                    701/31.4
2014/0004886 A1   1/2014 Gillett et al.
(Continued)

FOREIGN PATENT DOCUMENTS

CN       104380772 A     2/2015
CN       104796238 A     7/2015
(Continued)

OTHER PUBLICATIONS

"3rd Generation Partnership Project; Technical Specification Group Radio Access Network; Study on LTE-based V2X Services; (Release 14)", 3GPP Standard; 3GPP TR 36.885, 3rd Generation Partnership Project (3GPP), Mobile Competence Centre; 650, Route Des Lucioles; F-06921 Sophia-Antipolis Cedex; France, vol. RAN WG1, No. V1.0.0, Mar. 7, 2016 (Mar. 7, 2016), pp. 1-88, XP051087871, [retrieved on Mar. 7, 2016].
(Continued)

*Primary Examiner* — Jackie Zuniga Abad
(74) *Attorney, Agent, or Firm* — Arent Fox LLP/Qualcomm

(57) ABSTRACT

During device-to-device communication between two devices, a communication transmitted from a first UE to a second UE may not be reliably received by the second UE if the first UE is traveling at high speed. Therefore, a travel speed of a transmitting UE may be considered in determining a transmission configuration. According to an aspect, the UE may determine a travel speed of the UE. The UE may determine, based on the travel speed of the UE, a transmission configuration of the UE for device-to-device communication. The UE may transmit the device-to-device communication based on the transmission configuration.

40 Claims, 13 Drawing Sheets

(51) Int. Cl.
    *H04L 5/00* (2006.01)
    *H04L 1/00* (2006.01)
    *H04W 76/14* (2018.01)
    *H04W 72/02* (2009.01)
    *H04W 72/12* (2009.01)
    *H04L 29/08* (2006.01)
    *H04W 4/02* (2018.01)
    *H04W 4/021* (2018.01)
    *H04W 72/04* (2009.01)

(52) U.S. Cl.
    CPC .......... *H04L 1/0009* (2013.01); *H04L 5/0012* (2013.01); *H04L 5/0044* (2013.01); *H04L 5/0048* (2013.01); *H04L 5/0051* (2013.01); *H04L 5/0055* (2013.01); *H04L 5/0069* (2013.01); *H04L 67/12* (2013.01); *H04W 4/027* (2013.01); *H04W 4/46* (2018.02); *H04W 72/02* (2013.01); *H04W 72/12* (2013.01); *H04W 76/14* (2018.02); *H04L 5/001* (2013.01); *H04W 4/021* (2013.01); *H04W 72/048* (2013.01)

(58) Field of Classification Search
    CPC ... H04W 92/18; H04W 84/005; H04W 76/14; H04W 72/02
    See application file for complete search history.

(56) References Cited

U.S. PATENT DOCUMENTS

2015/0124895 A1* 5/2015 Park .................. H04B 7/0626
                                                            375/260
2015/0245397 A1   8/2015 Sachs et al.
2015/0270939 A1   9/2015 Ro et al.
2016/0037572 A1   2/2016 Yeh et al.
2017/0288806 A1* 10/2017 Blasco Serrano ...... H04W 4/70
2018/0219701 A1*  8/2018 Seo ...................... H04J 11/0079
2019/0053008 A1*  2/2019 He ......................... H04W 4/40

FOREIGN PATENT DOCUMENTS

EP            2863664 A1    4/2015
EP            2892192 A1    7/2015
WO     WO-2013036828 A1    3/2013
WO         2015021185 A1    2/2015

OTHER PUBLICATIONS

Partial International Search Report—PCT/US2017/020430—ISA/EPO—dated May 12, 2017.

International Search Report and Written Opinion—PCT/US2017/020430—ISA/EPO—dated Jul. 27, 2017.

LG Electronics: "Remaining issues for D2D control and data transmission", 3GPP Draft; R1-144027, 3rd Generation Partnership Project (3GPP), Mobile Competence Centre; 650, Route Des Lucioles; F-06921 Sophia-Antipolis Cedex; France vol. RAN WG1, No. Ljubljana, Slovenia; Oct. 6, 2014-Oct. 10, 2014, Sep. 27, 2014 (Sep. 27, 2014), XP050869691, pp. 1-5.

Taiwan Search Report—TW106107151—TIPO—dated Mar. 10, 2021.

* cited by examiner

SUPPORTING HIGH SPEEDS IN VEHICLE-TO-VEHICLE COMMUNICATION

CROSS-REFERENCE TO RELATED APPLICATION(S)

This application claims the benefit of U.S. Provisional Application Ser. No. 62/311,057, entitled "SUPPORTING HIGH SPEEDS IN LTE-D BASED V2V" and filed on Mar. 21, 2016 and U.S. Provisional Application Ser. No. 62/331,754, entitled "SUPPORTING HIGH SPEEDS IN VEHICLE-TO-VEHICLE COMMUNICATION" and filed on May 4, 2016, which are expressly incorporated by reference herein in its entirety.

BACKGROUND

Field

The present disclosure relates generally to communication systems, and more particularly, to vehicle-to-vehicle communications among devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Device-to-device (D2D) communication over a licensed spectrum has been under development to provide a way for a user equipment to directly communicate with another user equipment in LTE. Improvements are being continuously made to provide reliable device-to-device communication over the licensed spectrum in various circumstances

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

During D2D communication between two devices, a communication transmitted from a first UE to a second UE may not be reliably received by the second UE if the first UE is traveling at high speed. Therefore, the travel speed of a transmitting UE may be considered in determining the transmission configuration of the transmitting UE. In addition, when a UE receives control channel and data from other UEs, decoding of the control channel may be complex. Thus, an approach to reduce the complexity in decoding the control channel may be desirable.

In an aspect of the disclosure, a method, a computer-readable medium, and an apparatus for wireless communication are provided. The apparatus may be a UE. The apparatus may determine a travel speed of the UE. The apparatus may determine, based on the travel speed of the UE, a transmission configuration of the UE for device-to-device communication. The device-to-device communication may be over a licensed or unlicensed spectrum. The apparatus may transmit the device-to-device communication based on the transmission configuration.

In another aspect of the disclosure, a method, a computer-readable medium, and an apparatus for wireless communication are provided. The apparatus may be a UE. The apparatus may receive a communication from a transmitting UE via device-to-device communication. The device-to-device communication may be over a licensed or unlicensed spectrum. The apparatus may determine a corresponding set of scheduling assignment (SA) resources used to receive the communication from the transmitting UE among a plurality of sets of SA resources. The available SA resources may be divided into the plurality of sets of SA resources based on types of SA transmission configurations. The apparatus may decode an SA based on the communication within the corresponding set of SA resources. The apparatus may determine a data transmission configuration based on the SA within the corresponding set of SA resources. The apparatus may receive data from the transmitting UE based on the data transmission configuration.

In yet another aspect of the disclosure, a method, a computer-readable medium, and an apparatus for wireless communication are provided. The apparatus may be a UE. The apparatus may determine to enable group hopping for a plurality of demodulation reference signal (DM-RS) sequences associated with a control channel for device-to-device communication. The plurality of DM-RS sequences may be carried on a plurality of DM-RS symbols within the control channel of a subframe. The apparatus may determine the plurality of DM-RS sequences by applying a group hopping pattern to the plurality of DM-RS symbols. The apparatus may transmit or receive a scheduling assignment for the device-to-device communication with the plurality of DM-RS sequences.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
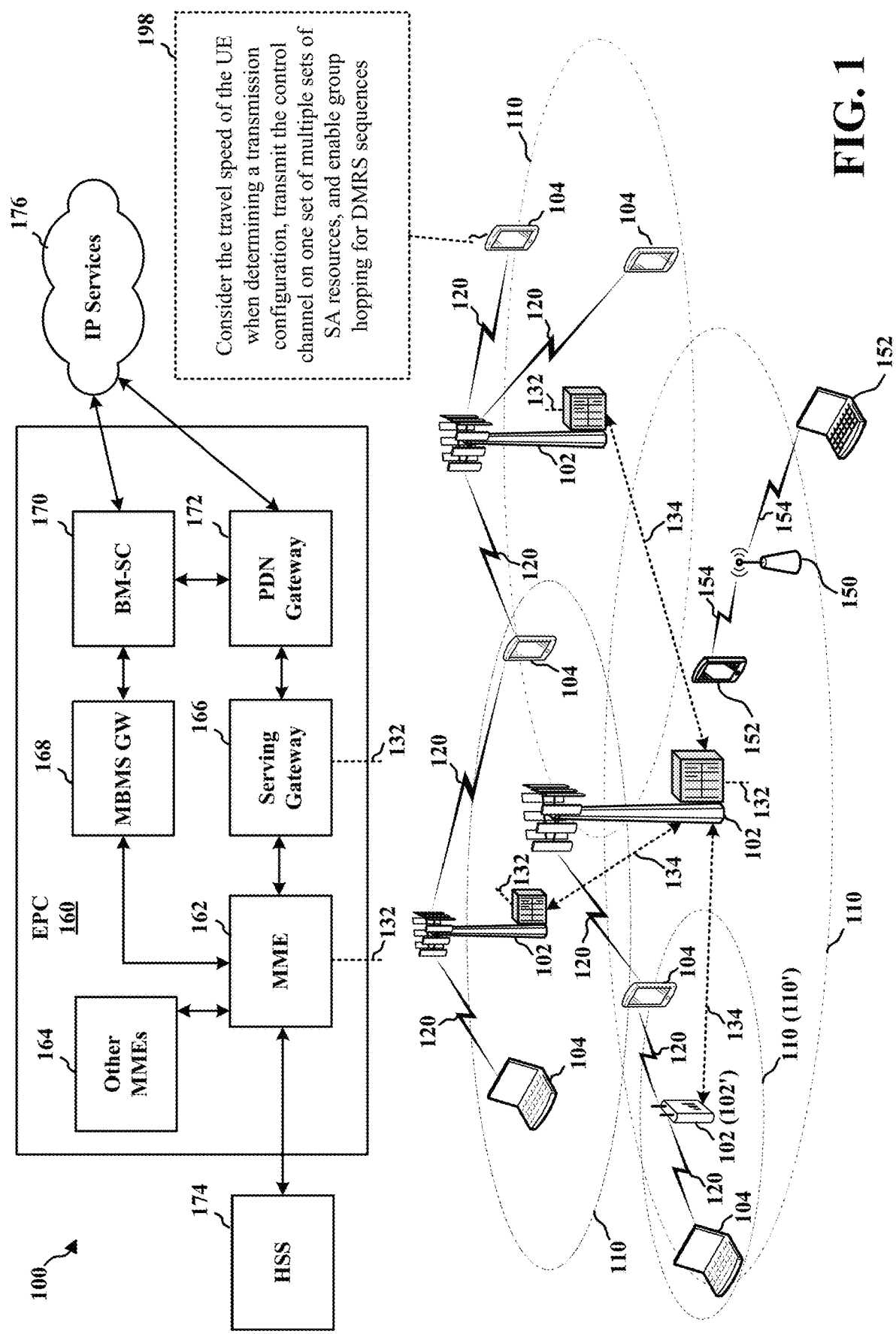
FIG. 1 is a diagram illustrating an example of a wireless communications system and an access network.
Figure 2:
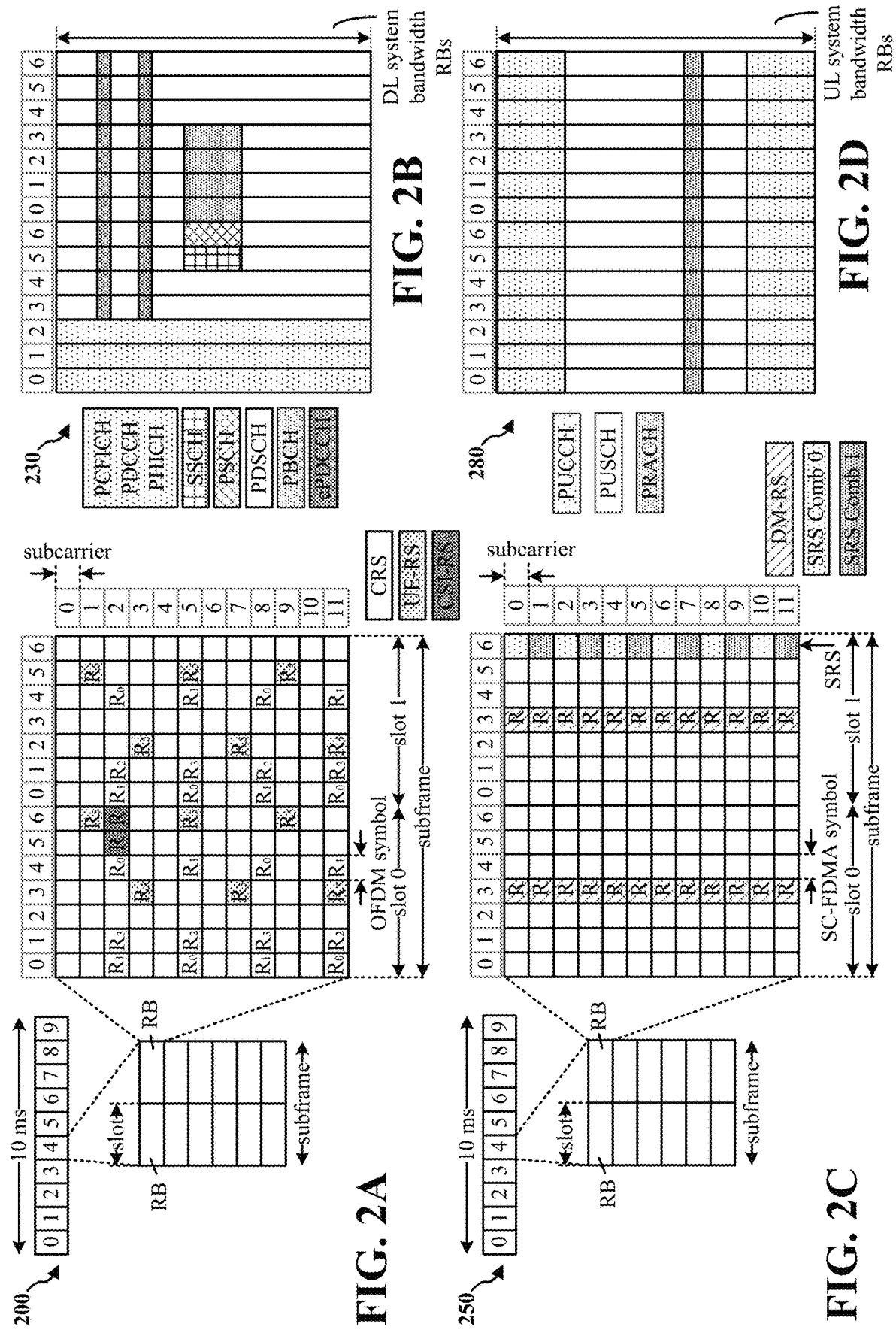
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured (198) to consider the travel speed of the UE 104 when determining a transmission configuration of the UE 104, to transmit the control channel on one set of multiple sets of SA resources, and to enable group hopping for DM-RS sequences associated with the control channel for device-to-device communication. The device-to-device communication may be vehicle-to-vehicle communication or vehicle-to-everything communication. Details of the operations performed at 198 will be further described below with references to FIGS. 2-13.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
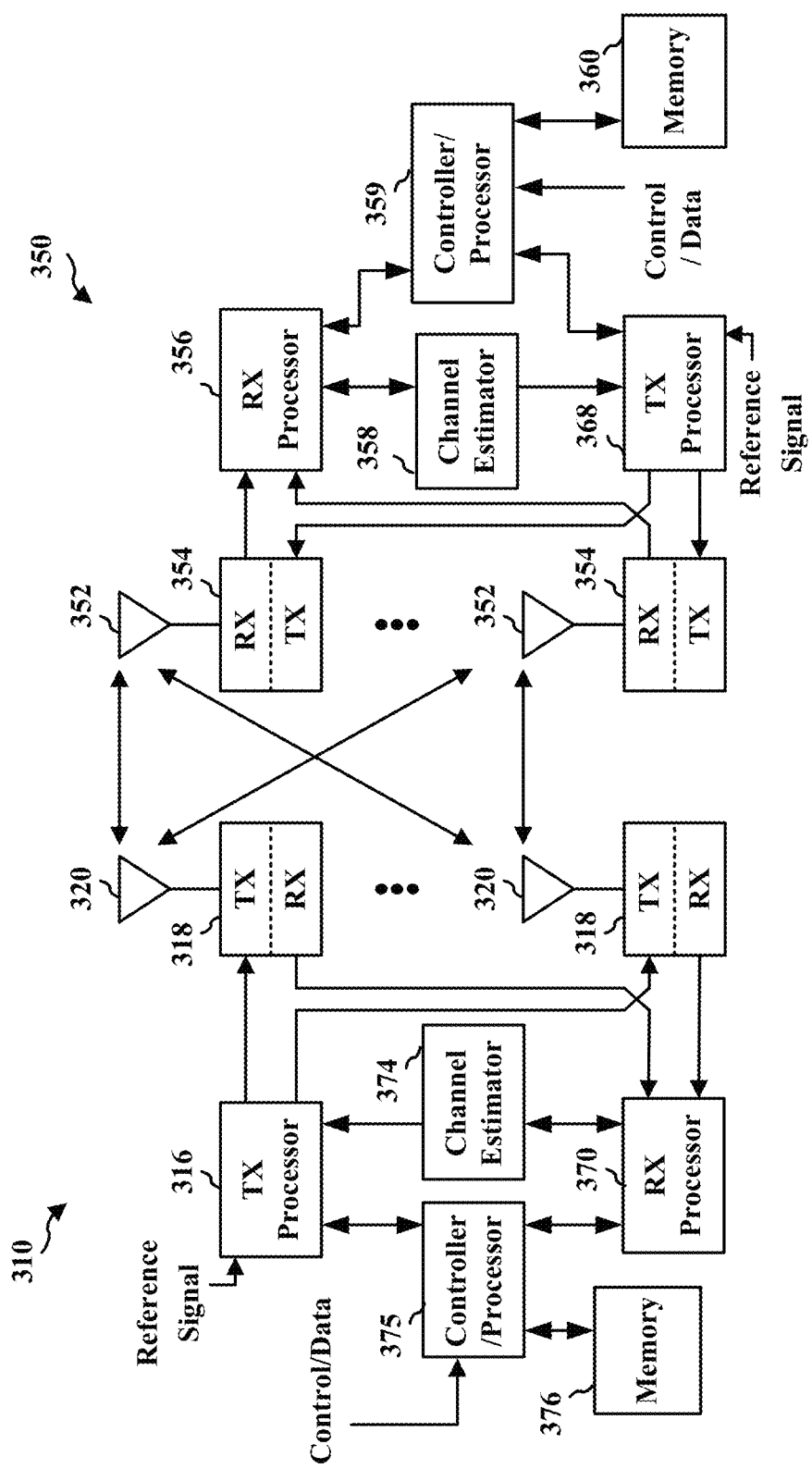
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
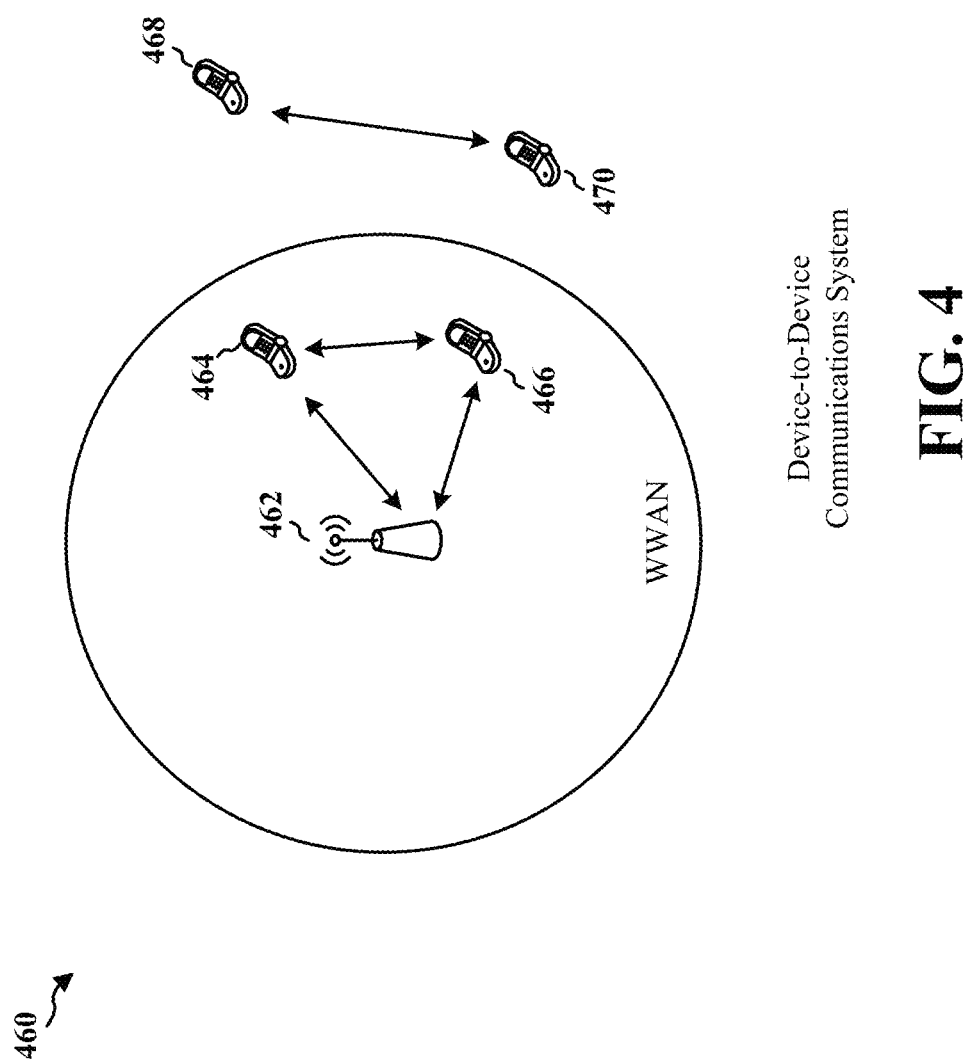
FIG. 4 is a diagram of an example of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication over a licensed spectrum may be used to provide direct communication between devices. One example of a D2D communication over a licensed spectrum includes communication using LTE Direct (LTE-D). D2D communication enables one UE to communicate with another UE and transmit data to the other UE over allocated resources. For example, UEs within the same network (e.g., within the same cell) or within a range with each other may directly communicate with each other over a licensed spectrum via LTE-D. LTE-D may also be used to discover nearby UEs in the same network. One application for the D2D communication over a licensed spectrum may be vehicle-to-vehicle (V2V) communication or vehicle-to-everything (V2X) communication. In V2V communication, a first vehicle's UE may perform D2D communication with another vehicle's UE over the licensed spectrum. In V2X communication, a vehicle's UE may perform D2D communication with another UE, regardless of whether the other UE resides in a vehicle or not, over the licensed spectrum.

During V2V communication (or V2X communication or D2D communication), a control channel and a data channel may be transmitted by a UE that wants to communicate with another UE. A communication resource pool may be shared for the control channel and the data channel, e.g., some resources are allocated to the control channel and the rest of the resources are allocated to the data channel. The control channel may be a physical sidelink control channel (PSCCH). The control channel may be referred to as a scheduling assignment (SA) channel because the control channel carries scheduling assignments. Each SA may indicate an MCS value and a location of resources in the data channel used to transmit data. The transmitting UE may transmit encoded data on the data channel to another UE. The data channel may be transmitted after the control channel is transmitted. The data channel may be a physical sidelink shared channel (PSSCH). When a UE wants to receive data from a transmitting UE, the control channel transmitted by the transmitting UE may be decoded to determine resources used to transmit data for the transmitting UE (e.g., where to look for in the data channel). The receiving UE may also determine the MCS for demodulating/decoding the data based on the MCS value indicated in the control channel. Thus, based on the information in the control channel, the receiving UE may locate the data in the resources configured for D2D communication, and may subsequently be able to decode the data in the data channel.

A UE located in a vehicle may experience channel conditions that change quicker than stationary devices in that the channel conditions observed by the UE in the vehicle are affected by the speed of the vehicle's movement. Thus, if a vehicle travels at a high speed, the UE in the vehicle also travels at a high speed. When traveling at high speed, the device's surrounding environment may change more rapidly, e.g., the number of reflections, the number of objects nearby, the Doppler spread, change more rapidly which in turn cause the communication channel conditions to change more rapidly. Rapidly changing channel conditions may result in less reliable channel estimation and reduce the reliability of channel decoding by the receiving UE. Aspects of the disclosure relate to techniques for D2D (or V2V/V2X) communication when the speed of the UE is high (e.g., 250 km/h to 500 km/h). The D2D (or V2V/V2X) communication may be over licensed or unlicensed spectrum.

Figure 5:
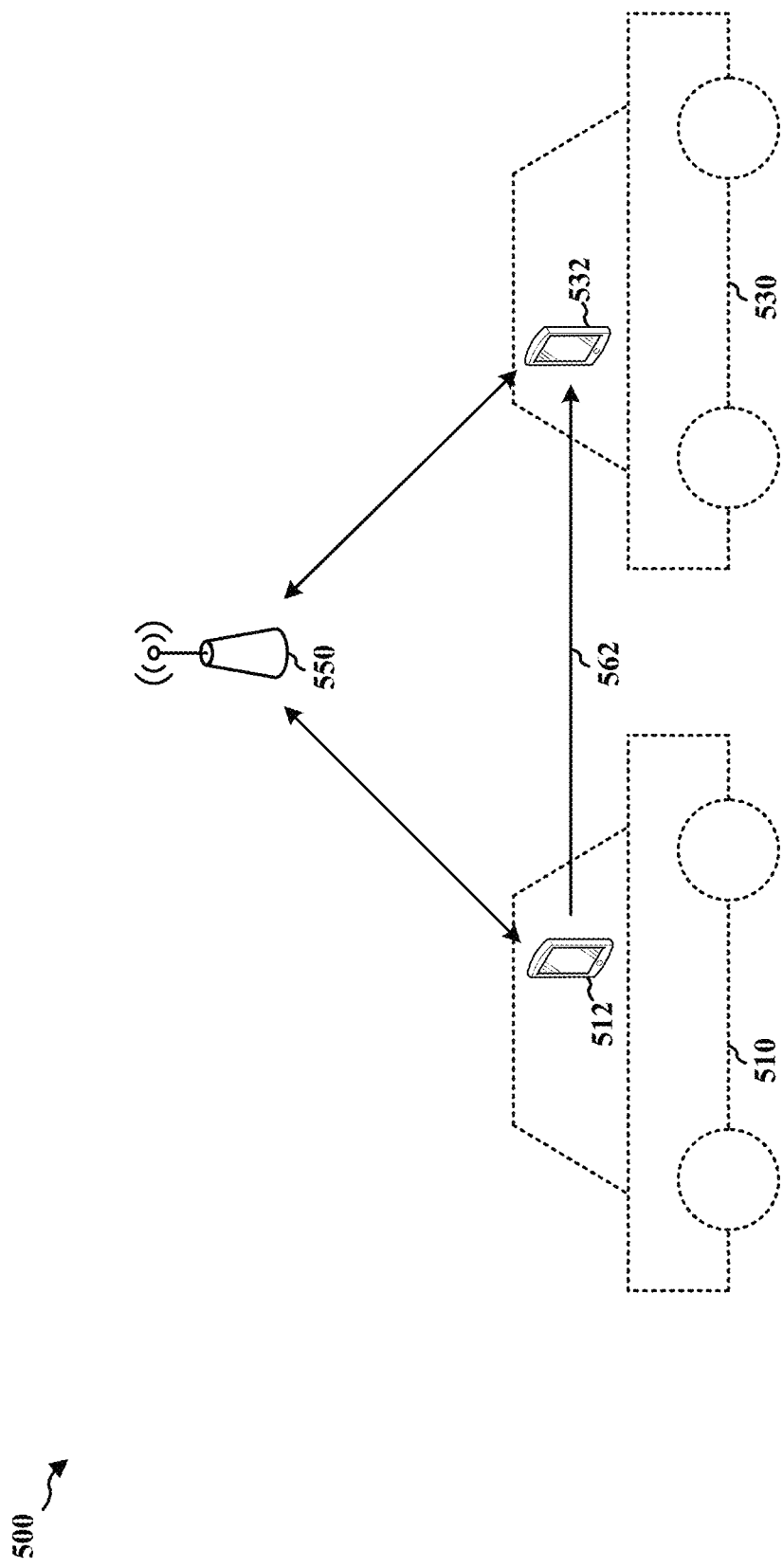
FIG. 5 is a diagram illustrating an example of a V2V communication system.

FIG. 5 is a diagram illustrating an example of a V2V communication system 500. A first UE 512 is present in a first vehicle 510, and thus may travel with the first vehicle 510. A second UE 532 may be present in a second vehicle 530 or may be present independently without the second vehicle 530. The first UE 512 and the second UE 532 may be connected to a base station 550. The first UE 512 and the second UE 532 may be configured to perform D2D communication (e.g., V2V communication or V2X communication) with each other. The D2D communication may be over a licensed or unlicensed spectrum. In the V2V communication system 500, the first UE 512 transmits data to the second UE 532 at 562. Thus, the first UE 512 may be referred to as a transmitting UE and the second UE 532 may be referred to as a receiving UE.

According to an aspect of the disclosure, when the transmitting UE (e.g., the first UE 512) is traveling at a high speed, the channel estimation used during channel decoding (e.g., the control channel or the data channel) by the receiving UE (e.g., the second UE 532) may be improved by increasing redundancies in the channels transmitted by the transmitting UE. In particular, the transmitting UE may estimate a travel speed (e.g., the absolute travel speed or the relative travel speed) of the transmitting UE, and determine the transmission configuration of the transmitting UE based on the speed of the transmitting UE. In an aspect, the transmitting UE may adjust the transmission configuration so that more redundancies in the channels are transmitted if the transmitting UE is traveling at a high speed. The transmission configuration may include at least one of an MCS value (e.g., modulation order and/or coding rate), the number of RBs that the transmitting UE uses for each (HARQ) transmission, and the number of (HARQ) retransmissions by the transmitting UE. For example, if the travel speed of the transmitting UE is high, the transmission configuration may be determined to have a lower MCS value and/or a higher number of RBs used by the transmitting UE and/or a higher number of retransmissions. For example, if the speed of the transmitting UE is low, the transmission configuration may be determined to have a higher MCS value and/or a lower number of RBs used by the transmitting UE and/or a lower number of retransmissions. In one example, the transmitting UE may determine that the travel speed is high when the travel speed exceeds a threshold, and may determine that the travel speed is low when the travel speed does not exceed the threshold. In one example, the transmitting UE may determine that the travel speed is high when the travel speed increases to exceed a high threshold, and may determine that the travel speed is low when the travel speed decreases to below a low threshold. A certain range of the travel speed may be associated with a certain transmission configuration. That is, different ranges of travel speed may correspond to different transmission configurations. The association of a travel speed and a transmission configuration corresponding to the travel speed may be preconfigured and/or may be signaled by the network (e.g., an eNB).

The transmission configuration may include an SA transmission configuration and a data transmission configuration. Both the SA transmission configuration and the data transmission configuration may be determined based on the travel speed of the transmitting UE. The transmitting UE may transmit the control channel based on the SA transmission configuration. The control channel may convey information about the data transmission configuration. The transmitting UE may transmit the data channel based on the data transmission configuration. Further, after decoding the control channel received from the transmitting UE, the receiving UE may receive the data channel from the transmitting UE based on the data transmission configuration conveyed in the control channel.

The transmitting UE may determine the travel speed based on the absolute travel speed of the transmitting UE and/or characteristics of a region where the transmitting UE is located. In an aspect, the travel speed may be a travel speed estimated by the transmitting UE or a speedometer reading of the vehicle. In an aspect, the transmitting UE may determine a maximum speed of a region corresponding to the location of the transmitting UE based on a speed limit of the region, where the location of the transmitting UE may be estimated by a location sensor such as a global positioning system (GPS) device. For example, if a speed limit of a road where the transmitting UE is located is 50 km/h, the transmitting UE may determine that the travel speed is 50 km/h. In an aspect, the transmitting UE may determine whether a region corresponding to the location of the transmitting UE is a high speed region such as a highway or a low speed region such as a local road. If the transmitting UE is determined to be located in a high speed region, the transmitting UE may determine that the travel speed is high. If the transmitting UE is determined to be located in a low speed region, the transmitting UE may determine that the travel speed is low.

In an aspect, the transmitting UE may receive information from a network, e.g., a LTE network or some other WWAN. The network may send speed limit information based on the current location of the transmitting UE. The location of the UE may be determined by the GPS location information sent by the transmitting UE or may be determined based on the signal received at a base station from the transmitting UE.

As an example, in a typical configuration, a transmitting UE may transmit 300 bytes of data over 20 RBs when moving at a low or medium speed. If the travel speed of the transmitting UE is high, the 300 bytes of data may be transmitted with a lower MCS, thus using more resources (e.g., 50 RBs). As an example, in a typical configuration, a transmitting UE may perform an SA transmission (e.g., via the control channel) over 1 RB when moving at a low or medium speed. If the travel speed of the transmitting UE is high, redundancies may be added by repetition of the SA transmission over 2 RBs. With sufficient redundancies, the receiving UE may successfully decode the control channel and the data channel even if the receiving UE does not have a good estimation of the channel conditions due to the high travel speed. For example, if the transmitting UE determines that the transmitting UE has entered a high-speed area and/or is moving at a high speed (more than 140 km/h) and thus the travel speed is high, the transmitting UE may transmit the same amount (e.g., 300 bytes) of data with a lower MCS (e.g. over 50 RBs rather than 20 RBs).

Figure 6:
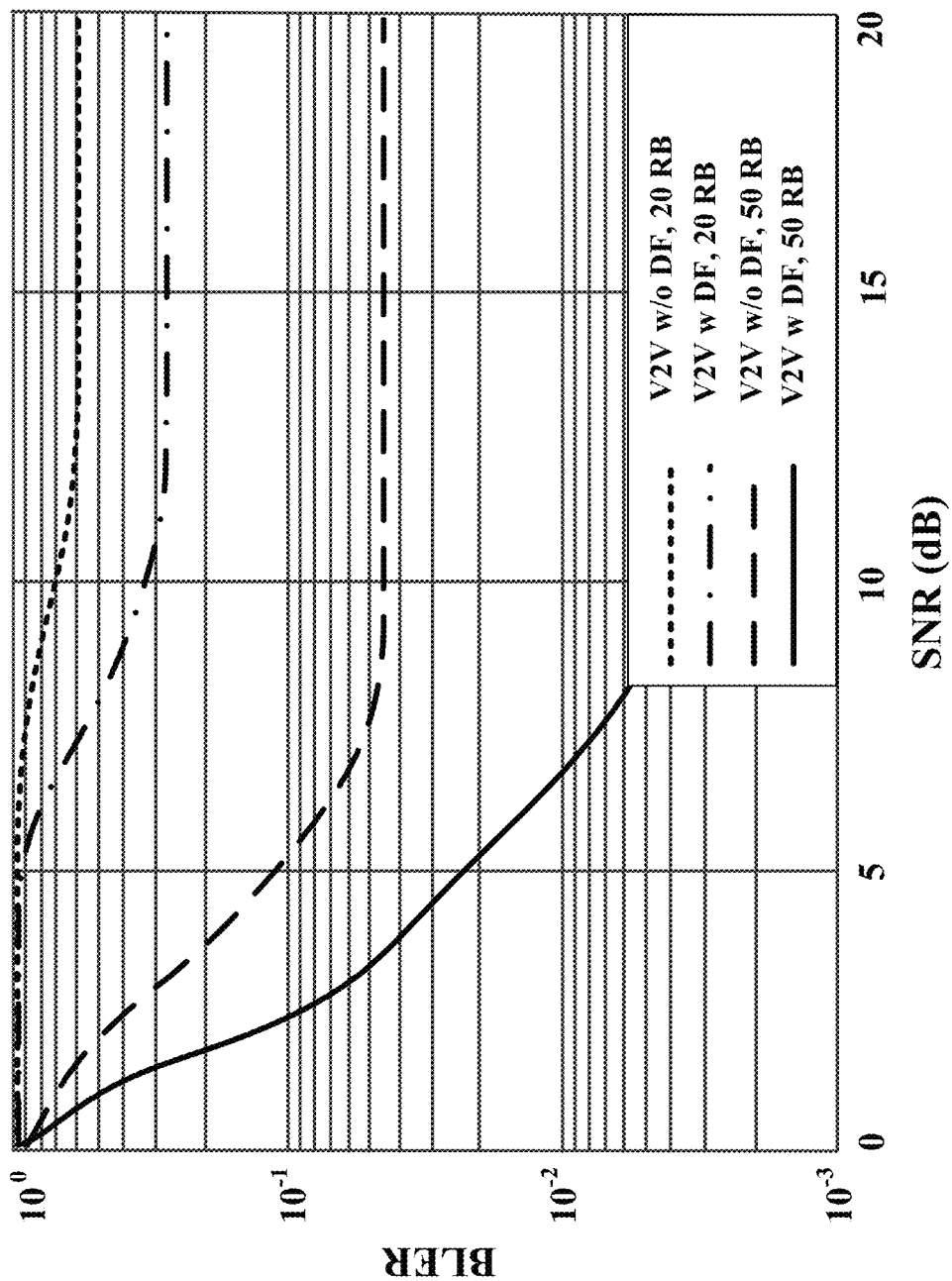
FIG. 6 is an example plot illustrating an error rate experienced by a UE in various situations.

FIG. 6 is an example plot 600 illustrating an error rate experienced by a UE in various situations. The example plot 600 shows a block error rate versus signal to noise ratio (SNR) in V2V communication between a transmitting UE and a receiving UE when the transmitting UE is traveling at a speed of 250 km/h. The example plot 600 illustrates that, at a high speed such as 250 km/h, using a typical MCS (e.g., transmitting 300 bytes of data over 20 RBs) may result in a high block error rate (BLER) at the receiving UE regardless of the SNR at the receiving UE. For example, according to the example plot 600, at 250 km/h, if a typical MCS (e.g., transmitting 300 bytes of data over 20 RBs) is used, achieving a low BLER of 10% may be difficult, regardless of whether a decision feedback (DF) algorithm is used. However, as the example plot 600 illustrates, at 250 km/h, if 50 RBs are used (e.g., for a lower MCS) to transmit 300 bytes of data, a low BLER of 10% may be achieved for a 2.5 dB SNR when the DF algorithm is used, and for a 5 dB SNR when the DF algorithm is not used.

The complexity of the receiving UE may increase if different SA transmission configurations are used to transmit SA channel. For example, the number of hypotheses (possible combinations of valid control channel resources) that have to be tested by the receiving UE to decode the control channel may increase (e.g., non-linearly) with the number of transmission configurations utilized. For example, if an available SA resource pool has 20 RBs per subframe and a typical SA transmission is performed on 1 RB and an SA transmission for high speed is performed on 2 RBs, there may be 20 different hypotheses (20 different possible combinations) for the typical SA transmission and 10 different hypotheses for the high speed SA transmission, per subframe. In this example, the possibilities may be RB #0, RB #1, RB #2, . . . RB #19 for the typical SA transmission and RBs #0#1, RBs #2#3, RBs #4#5, . . . RBs #18#19. Thus, in this example, there may be 30 possible total hypotheses per subframe. Therefore, an approach to reduce the complexity in channel decoding may be desirable.

According to an aspect of the disclosure, available SA resources may be divided into multiple sets (e.g., N sets) of SA resources based on the transmission configurations. The SA resources may be set aside for transmission of a control channel, and every UE within a system may utilize the same SA resources to transmit a control channel. Thus, a UE wanting to receive a communication from another UE may attempt to decode a control channel in the SA resources based on the hypotheses. In an aspect, a first set of resources may have a fixed transmission configuration such that one blind decode may be used to detect the presence of a control channel in the first set of SA resources. The first set of SA resources may be used for a typical transmission configuration, e.g., a low to medium speed for coexistence with legacy devices.

The size of each set of SA resources may depend on a travel speed of the transmitting UE. Further, the type of SA transmission configuration associated to each set of SA resources may depend on a travel speed of the transmitting UE. Different sets of SA resources may correspond to different travel speeds. The size and the SA transmission configuration for each set of SA resources may be fixed, or preconfigured for a respective region, or may be signaled by a network (e.g., by an eNB).

In an aspect, a first set of multiple sets of SA resources may be used to communicate with a fixed SA transmission configuration (e.g., fixed MCS and resource size) and may not be used to communicate with other types of SA transmission configurations. The first set of SA resources may be used when the SA transmission configuration does not vary based on the travel speed of the transmitting UE. Other sets (excluding the first set) of SA resources may be used by the transmitting UE to communicate using a configuration that varies according to the travel speed of the transmitting UE. Thus, other sets of SA resources may be used when the transmitting UE travels at high speeds. Therefore, if the transmitting UE determines to use the fixed SA transmission configuration, the transmitting UE may transmit the control channel using any one of the multiple sets of SA resources. If the transmitting UE determines to vary the SA transmission configuration based on the speed of the transmitting UE, the transmitting UE may transmit the control channel using a set of SA resources that is other than the first set of SA resources. In one configuration, the set of SA resources used may correspond to the speed of the transmitting UE.

Figure 7:
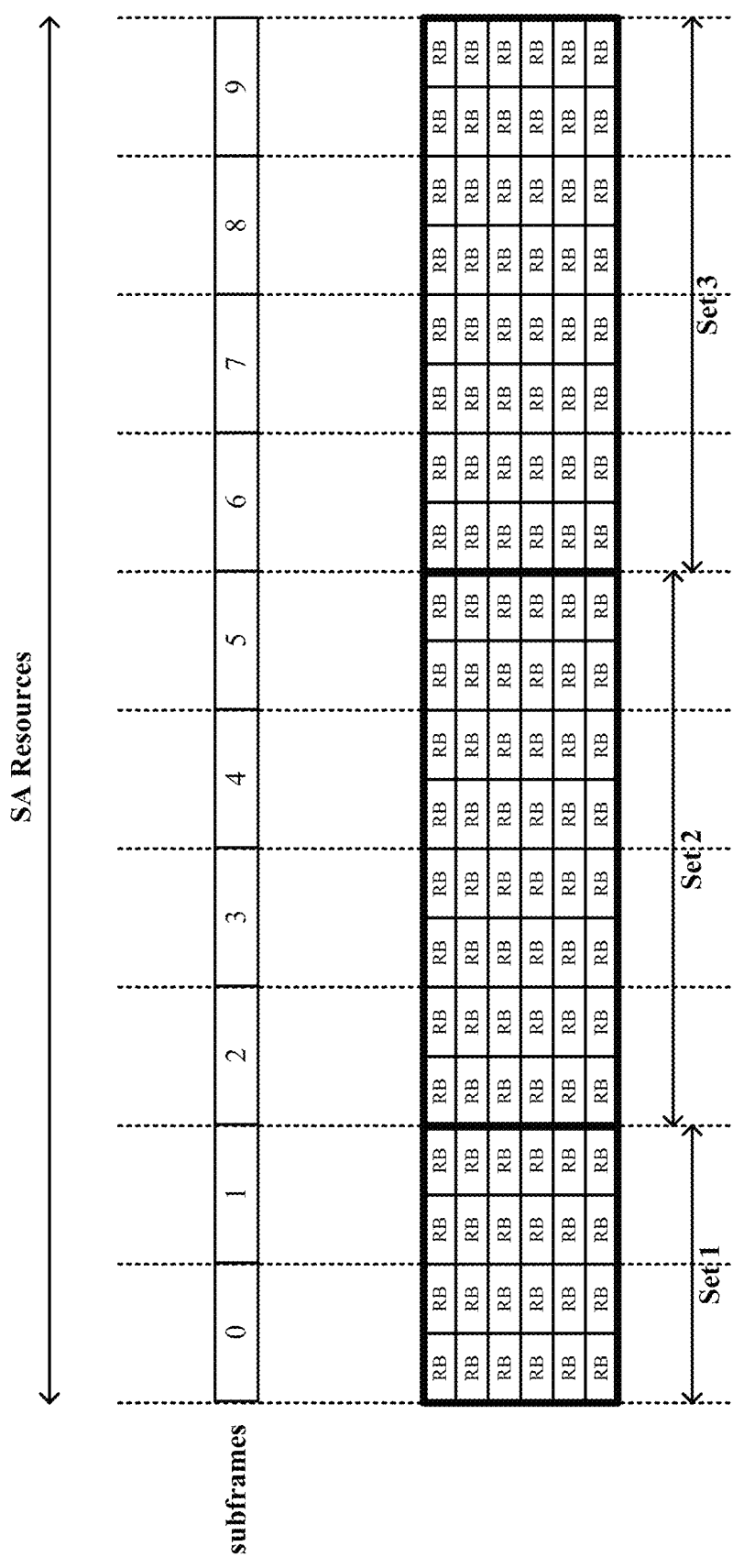
FIG. 7 is an example diagram illustrating SA resources, according to an aspect of the disclosure.

FIG. 7 is an example diagram 700 illustrating SA resources, according to an aspect of the disclosure. In this example, the SA resources may include 10 subframes numbered 0 to 9. Each subframe may include a fixed number of resource blocks, e.g., 12 RBs. As shown in the diagram 700, the SA resources may be divided into three sets of SA resources including Set 1, Set 2 and Set 3. Set 1 includes RBs for subframe number 0 and 1, Set 2 includes RBs for subframe numbers 2, 3, 4, and 5, and Set 3 includes RBs for subframe numbers 6, 7, 8, and 9. Set 1 may be dedicated to a fixed SA transmission configuration. Set 2 may be used to communicate an SA transmission configuration when a travel speed of the transmitting UE is a medium speed or may be used to communicate a fixed SA transmission configuration. Set 3 may be used to communicate an SA transmission configuration when the travel speed of the transmitting UE is a high speed or may be used to communicate a fixed SA transmission configuration. Thus, if the transmitting UE determines to use the typical configuration with a fixed SA transmission configuration, the transmitting UE may use any one of Set 1, Set 2 and Set 3 to communicate the control channel. If the transmitting UE determines to use a varying configuration based on the travel speed of the transmitting UE, the transmitting UE may use Set 2 or Set 3 to communicate the control channel, depending on the travel speed of the transmitting UE. In an aspect, the transmitting UE may use Set 1 for the typical configuration of the SA transmission mode to reduce complexity at the receiving UE.

The receiving UE may receive transmissions from various transmitting UEs. The receiving UE may determine which set of SA resources is used to transmit a control channel by a transmitting UE. If the receiving UE receives communication from the transmitting UE in one set of the multiple sets of SA resources, the receiving UE may attempt to decode (e.g., by blind decoding) a control channel from the set of SA resources, based on an SA transmission configuration for the control channel. Because the receiving UE may not attempt to decode from the entire SA resources, but may attempt to decode from a subset of SA resources, the complexity in decoding may be reduced. Further, for example, Set 1 may be dedicated to the fixed SA transmission configuration, and thus the hypotheses for Set 1 may be limited to the fixed SA transmission configuration, which reduces complexity in decoding. When the control channel is decoded, the receiving UE may determine a data transmission configuration based on the control channel. Subsequently, the receiving UE may receive data from the transmitting UE based on the data transmission configuration. For example, referring to the example in FIG. 7, if the receiving UE determines that Set 1 is used to transmit SA, the receiving UE may attempt to decode the control channel based on a fixed SA transmission configuration from Set 1, and may not attempt to decode from Set 2 or Set 3. For example, referring to the example in FIG. 7, if the receiving UE determines that Set 3 is used to transmit SA, the receiving UE may attempt to decode the control channel based on a fixed SA transmission configuration and may also attempt to decode the control channel based on an SA transmission configuration for high travel speed, from Set 3. In such an example, if the transmitting UE utilizes a varying configuration based on the transmission, the receiving UE may end up decoding the control channel based on an SA transmission configuration for high travel speed. If the transmitting UE utilizes a fixed configuration, the receiving UE may end up decoding the control channel based on the fixed SA transmission configuration.

In one configuration, the fixed SA transmission configuration for a typical configuration may be defined based on the scenario (e.g., the geographical region). For example, low to medium speed may be typical in an urban area, thus the fixed SA transmission configuration may correspond to the transmitting UE moving at low to medium speed. Similarly, high speed may be typical in a rural highway, thus the fixed SA transmission configuration may correspond to the transmitting UE moving at high speed.

Figure 8:
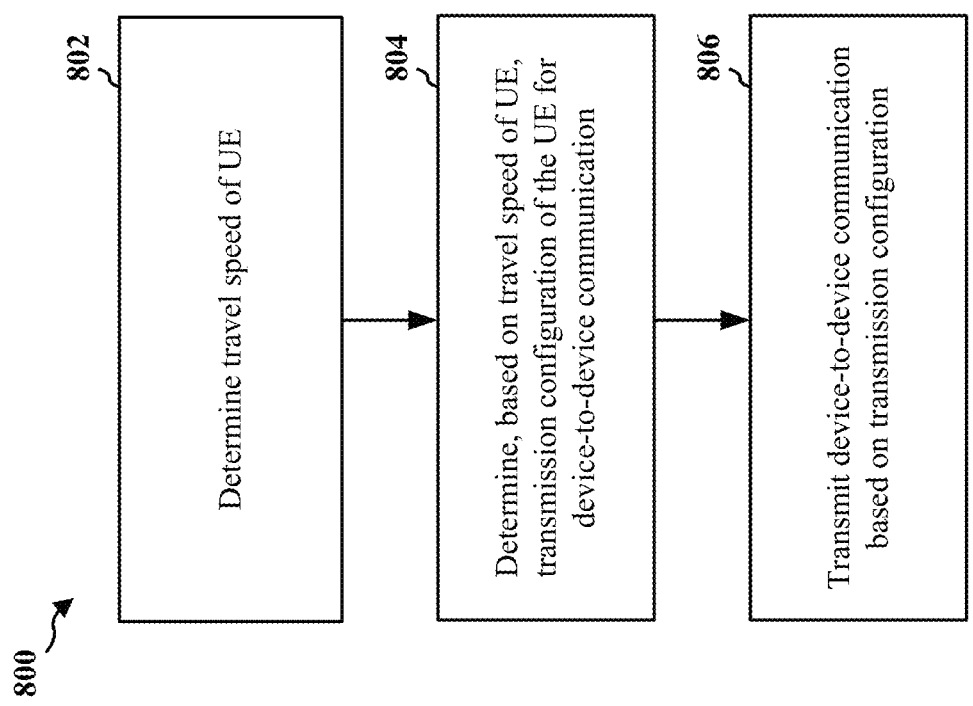
FIG. 8 is a flowchart of a method of wireless communication, according to an aspect of the disclosure.

FIG. 8 is a flowchart 800 of a method of wireless communication, according to an aspect of the disclosure. The method may be performed by a UE (e.g., the UE 104, the first UE 512, the apparatus 1202/1202').

At 802, the UE may determine a travel speed of the UE. In an aspect, the travel speed may be determined based on at least one of the travel speed of the UE or a maximum travel speed corresponding to the location of the UE. In an aspect, the maximum travel speed corresponding to the location of the UE may be determined by: determining the location of the UE, and determining the maximum travel speed corresponding to the location of the UE. In an aspect, the maximum travel speed corresponding to the location of the UE may be a speed limit of the area corresponding to the location of the UE. In an aspect, travel speed may be further determined based on a travel speed of the receiving UE.

At 804, the UE may determine, based on the travel speed of the UE, a transmission configuration of the UE for device-to-device communication. The D2D communication may be V2V communication or V2X communication. The device-to-device communication may be over a licensed or unlicensed spectrum. In an aspect, the transmission configuration may include at least one of an MCS, the number of resource blocks used for transmission, and the number of retransmissions. In an aspect, the association between the travel speed and a corresponding transmission configuration may be preconfigured or may be received from a base station.

In an aspect, when the travel speed of the UE increases, the UE may adjust the transmission configuration of the UE by performing at least one of: increasing the number of resource blocks used for transmission, decreasing the modulation and coding scheme (MCS) value, or increasing the number of retransmissions. In an aspect, when the travel speed of the UE decreases, the UE may adjust the transmission configuration of the UE by performing at least one of: decreasing the number of resource blocks used for transmission, increasing the MCS value, or decreasing the number of retransmissions.

At 806, the UE may transmit the device-to-device communication based on the transmission configuration. In an aspect, the UE may transmit the device-to-device communication by transmitting an SA based on an SA transmission configuration, and transmitting data via a data channel based on a data transmission configuration. In such an aspect, the SA indicates the data transmission configuration and a location of resources in the data channel for transmitting data.

In an aspect, the UE may transmit the device-to-device communication by: transmitting the SA on any one of a plurality of sets of SA resources if the UE determines to utilize a fixed SA transmission configuration, and transmitting the SA on a corresponding set of SA resources other than the first set of SA resources if the UE determines to vary the SA transmission configuration of the UE based on the travel speed of the UE. The available SA resources may be divided into the plurality of sets of SA resources based on types of SA transmission configurations. In such an aspect, the first set of SA resources may be associated with the fixed SA transmission configuration, and each of other sets of SA resources may be associated with a corresponding type of SA transmission configuration and the fixed SA transmission configuration. In such an aspect, the size of each set of SA resources and at least one type of SA transmission configuration for each set of SA resources may be associated with a corresponding travel speed of the UE. In such an aspect, at least one of the size of each set of SA resources or the at least one type of SA transmission configuration for each set of SA resources may be preconfigured or may be received from a base station.

Figure 9:
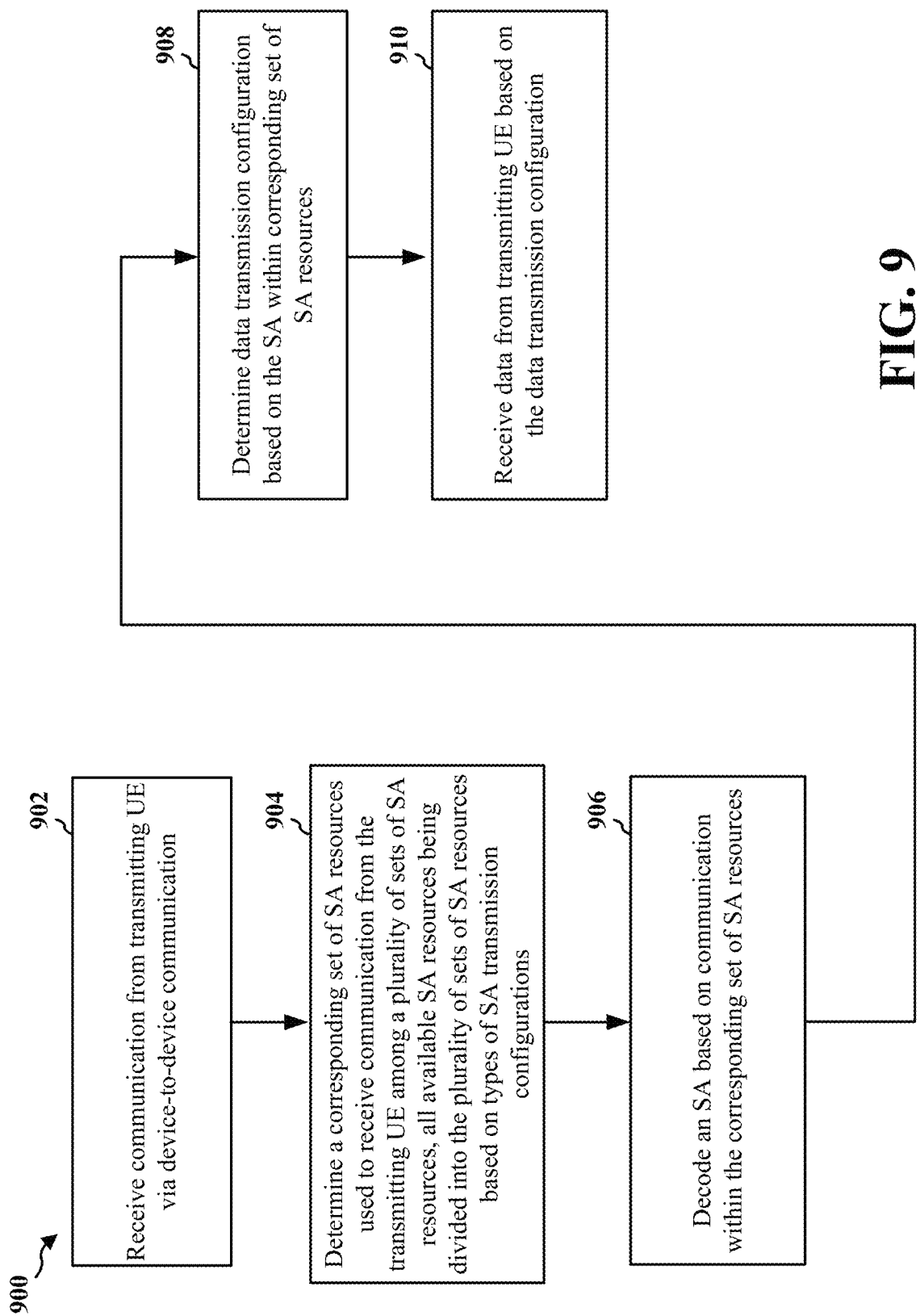
FIG. 9 is a flowchart of a method of wireless communication, according to an aspect of the disclosure.

FIG. 9 is a flowchart 900 of a method of wireless communication, according to an aspect of the disclosure. The method may be performed by a UE (e.g., the UE 104, the second UE 532, the apparatus 1202/1202').

At 902, the UE may receive a communication from a transmitting UE via a device-to-device communication. The device-to-device communication may be over a licensed or unlicensed spectrum.

At 904, the UE may determine a corresponding set of SA resources used to receive the communication from the transmitting UE among a plurality of sets of SA resources. The available SA resources may be divided into the plurality of sets of SA resources based on types of SA transmission configurations.

At 906, the UE may decode an SA based on the communication within the corresponding set of SA resources. In an aspect, the UE may decode the SA indicating the data transmission configuration by blind decoding within the corresponding set of SA resources. In an aspect, the UE may decode the SA based on a fixed SA configuration if the corresponding set of SA resources is the first set of SA resources, and may decode the SA based on the fixed SA configuration or an SA transmission configuration associated with the corresponding set of SA resources if the corresponding set of SA resources is a set of SA resources different from the first set.

At 908, the UE may determine a data transmission configuration based on the SA within the corresponding set of SA resources.

At 910, the UE may receive a data transmission from the transmitting UE based on the data transmission configuration. In an aspect, the data transmission configuration may include at least one of an MCS, the number of resource blocks used for transmission, and the number of retransmissions.

In an aspect, the UE may receive the data transmission by determining a location of resources within the data channel based on the SA, and receiving the data transmission based on the location of resources and the data transmission configuration. In an aspect, the size of each set of SA resources and at least one type of SA transmission configuration for each set of SA resources may be associated with a corresponding travel speed of the transmitting UE. In such an aspect, at least one of the size of each set of SA resources or the at least one type of SA transmission configuration for each set of SA resources may be preconfigured or may be received from a base station.

Wireless networks may employ Zadoff-Chu sequences to orthogonalize or pseudo-orthogonalize wireless signals. A Zadoff-Chu sequence is a complex-valued mathematical sequence which can be applied to a radio signal and results in a substantially constant amplitude signal. Further, cyclic shifted versions of the Zadoff-Chu sequence and the radio signal are pseudo-orthogonal when received by a receiver. A generated Zadoff-Chu sequence that is not cyclic shifted is a root sequence. In one configuration, each root sequence may be identified by a unique root index.

In one configuration, a subframe for D2D (or V2V/V2X) communication may include multiple DM-RS symbols. Some of these DM-RS symbols may be within the control channel (e.g., PSCCH) of the subframe. Some of these DM-RS symbols may be within the data channel (e.g., PSSCH) of the subframe. A Zadoff-Chu sequence may be transmitted on each DM-RS symbol within a subframe. Such Zadoff-Chu sequence may be referred to as a DM-RS sequence. In one configuration, a DM-RS sequence may refer to a sequence other than a Zadoff-Chu sequence. In one configuration, group hopping may be enabled for DM-RS sequences of the control channel, such that within the control channel different DM-RS sequences are transmitted on different DM-RS symbols. In one configuration, group hopping may refer to hopping or changing the root indices of the Zadoff-Chu sequences used for different DM-RS symbols. In one configuration, enabling group hopping for DM-RS symbols within a subframe may resolve or alleviate the timing/frequency ambiguity issue encountered by vehicular D2D devices.

Figure 10:
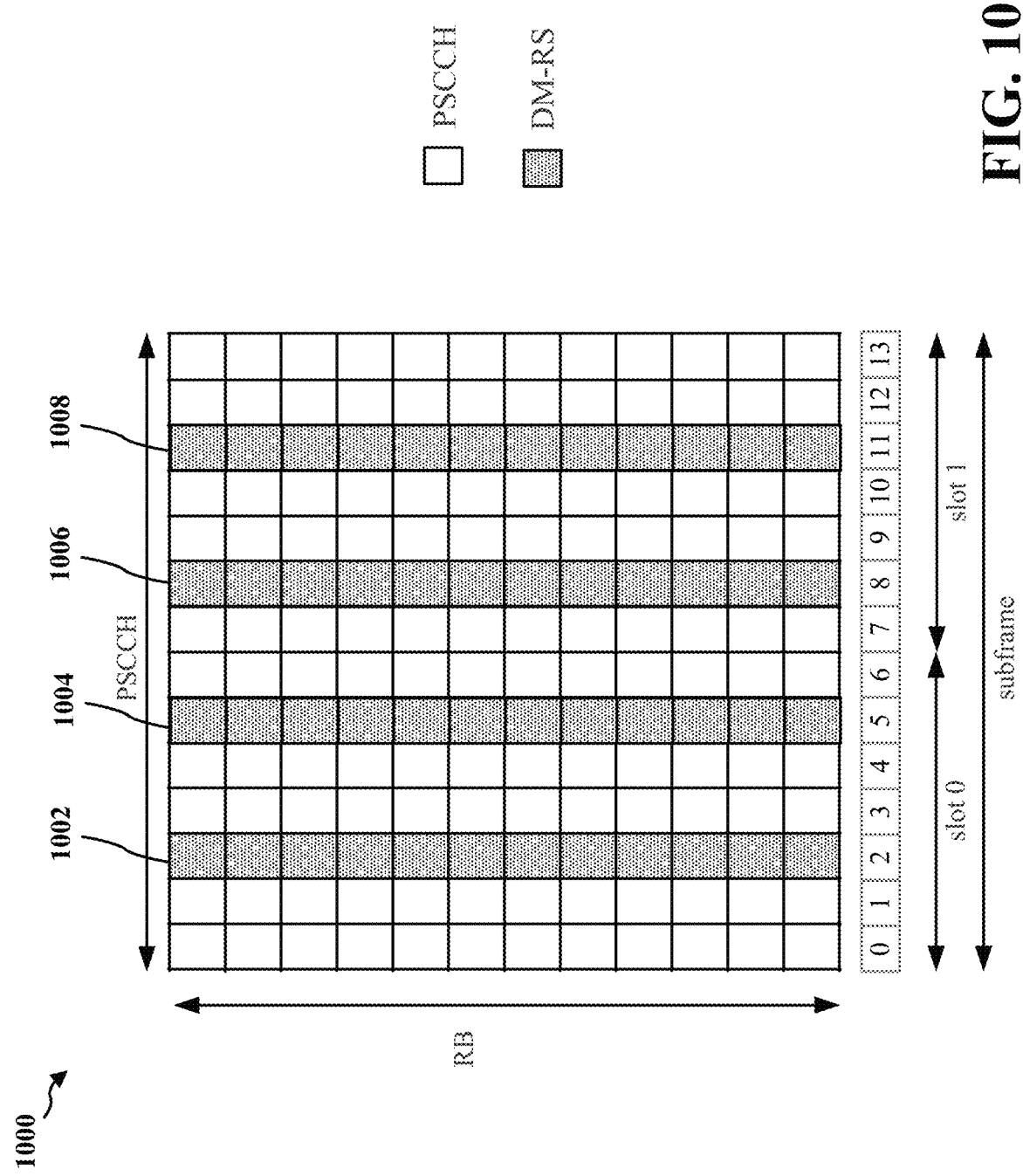
FIG. 10 is a diagram illustrating an example of enabling group hopping for DM-RS symbols within a subframe.

FIG. 10 is a diagram 1000 illustrating an example of enabling group hopping for DM-RS symbols within a subframe. In this example, a subframe for D2D (or V2V/V2X) communication may include four DM-RS symbols 1002, 1004, 1006, and 1008. The DM-RS symbols 1002, 1004, 1006, and 1008 are within the control channel (e.g., PSCCH) of the D2D or V2V/V2X communication.

In one configuration, group hopping may be enabled for DM-RS symbols within the control channel. In such a configuration, the root indices of the Zadoff-Chu sequences used for the DM-RS symbols 1002, 1004, 1006, and 1008 may be different.

In one configuration, the DM-RS sequence used for each DM-RS symbol within the control channel may be determined at least in part based on a group hopping pattern. In one configuration, a group hopping pattern may be a pattern of different root indices for the Zadoff-Chu sequences used for different DM-RS symbols. In one configuration, the group hopping pattern may be determined by the different root indices for the Zadoff-Chu sequences used for different DM-RS symbols.

In one configuration, the root index of a Zadoff-Chu sequence for a DM-RS symbol may be a function of the time resource index. The time resource index may refer to either slot index or symbol index of the DM-RS symbol. For example, the root index of the Zadoff-Chu sequence for the DM-RS symbol 1002 may be a function of the slot index (e.g., "0") or a function of the symbol index (e.g., "2") of the DM-RS symbol 1002; and the root index of the Zadoff-Chu sequence for the DM-RS symbol 1006 may be a function of the slot index (e.g., "1") or a function of the symbol index (e.g., "8") of the DM-RS symbol 1006.

In one configuration, the root index of a Zadoff-Chu sequence for a DM-RS symbol may be a function of the frequency resource index, within the scheduling assignment resource pool, used by the corresponding control channel. For example, the root index of the Zadoff-Chu sequence for the DM-RS symbol 1002 may be a function of the index of the first resource block (RB) used by PSCCH of the subframe. Similarly, the root index of the Zadoff-Chu sequence for the DM-RS symbol 1004 may be a function of the index of the first RB used by PSCCH of the subframe.

In one configuration, the root index of a Zadoff-Chu sequence for a DM-RS symbol may be a function of an identifier. The identifier may be determined at least in part based on an SA identifier associated with the D2D or V2V/V2X communication. The identifier may provide some randomization over the potentially interfering DM-RS transmissions from different UEs. In one configuration, the identifier may be fixed.

In one configuration, the UE in a D2D or V2V/V2X communication may determine to enable or disable group hopping for DM-RS symbols in the control channel (e.g., PSCCH) based on one or more of: the speed of the UE, a pre-configuration, or a signaling from an eNB. For example, the UE may determine to enable group hopping for DM-RS symbols in the control channel when its speed is faster than or equal to a threshold (e.g., 140 km/h), and the UE may determine to disable group hopping for DM-RS symbols in the control channel when its speed is slower than the threshold. The UE may determine its speed using methods described above with reference to FIG. 5.

In one configuration, the UE in a D2D or V2V/V2X communication may apply a group hopping pattern to DM-RS symbols in the data channel (e.g., PSSCH). In one configuration, the group hopping pattern applied to the DM-RS symbols in the data channel may be similar to the group hopping pattern described above for the DM-RS symbols of the control channel. In one configuration, the group hopping pattern applied to the DM-RS symbols in the data channel may be a function of the symbol index of the DM-RS symbol. Using the symbol index of the DM-RS symbol to determine the root index of the Zadoff-Chu sequence for the DM-RS symbol may make it highly likely that all DM-RS symbols transmitted within the subframe are different (e.g., using different root indices). In one configuration, the group hopping pattern applied to the DM-RS symbols in the data channel may be a function of the slot index of the DM-RS symbol.

Figure 11:
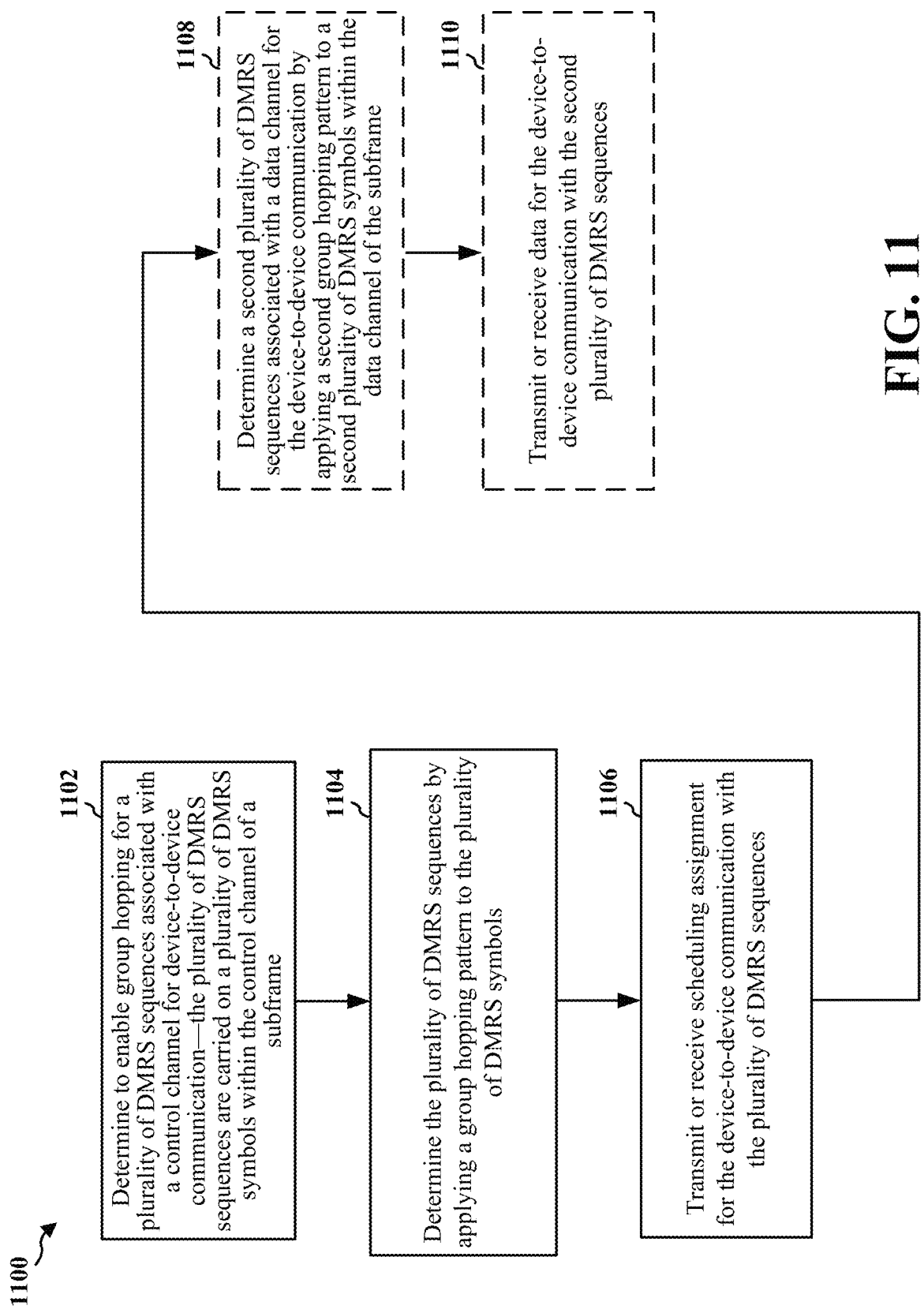
FIG. 11 is a flowchart of a method of wireless communication in accordance with an aspect of the disclosure.

FIG. 11 is a flowchart 1100 of a method of wireless communication in accordance with an aspect of the disclosure. Specifically, this figure illustrates a method of enabling grouping hopping for DM-RS symbols within a control channel for D2D or V2V/V2X communication. The method may be performed by a UE (e.g., the UE 104, the first UE 512, the second UE 532, or the apparatus 1202/1202').

At 1102, the UE may determine to enable group hopping for a plurality of DM-RS sequences associated with a control channel (e.g., PSCCH) for device-to-device communication. The plurality of DM-RS sequences may be carried on a plurality of DM-RS symbols (e.g., 1002, 1004, 1006, and 1008) within the control channel of a subframe. In one configuration, the determination of enabling group hopping may be based on one or more of a travel speed of the UE, a pre-configuration, or an eNB signaling. In one configuration, different DM-RS sequences may be carried on different DM-RS symbols.

At 1104, the UE may determine the plurality of DM-RS sequences by applying a group hopping pattern to the plurality of DM-RS symbols. In one configuration, the plurality of DM-RS sequences may be generated based on Zadoff-Chu sequences. In one configuration, to apply the group hopping pattern to the plurality of DM-RS symbols, the UE changes root indices of the Zadoff-Chu sequences used for different DM-RS symbols.

In one configuration, a root index of a Zadoff-Chu sequence used for a DM-RS symbol of the plurality of DM-RS symbols may be determined based on a time resource index. In one configuration, the time resource index may be a slot index of the DM-RS symbol or a symbol index of the DM-RS symbol. In one configuration, the root index of the Zadoff-Chu sequence used for the DM-RS symbol may be determined further based on a frequency resource index used by the control channel. In one configuration, the root index of the Zadoff-Chu sequence used for the DM-RS symbol may be determined further based on an identifier. In one configuration, the identifier may be determined based at least in part on a scheduling assignment identifier associated with the device-to-device communication. In another configuration, the identifier may be a fixed identifier.

At 1106, the UE may transmit or receive a scheduling assignment for the device-to-device communication along with the plurality of DM-RS sequences.

At 1108, the UE may optionally determine a second plurality of DM-RS sequences associated with a data channel (e.g., PSSCH) for the device-to-device communication by applying a second group hopping pattern to a second plurality of DM-RS symbols within the data channel of the subframe. In one configuration, the second plurality of DM-RS sequences may be generated based on Zadoff-Chu sequences. In one configuration, to apply the second group hopping pattern to the second plurality of DM-RS symbols, the UE may change root indices of the Zadoff-Chu sequences used for different DM-RS symbols. In one configuration, a root index of a Zadoff-Chu sequence used for a DM-RS symbol of the second plurality of DM-RS symbols may be determined based on a slot index of the DM-RS symbol.

At 1110, the UE may optionally transmit or receive data for the device-to-device communication with the second plurality of DM-RS sequences.

Figure 12:
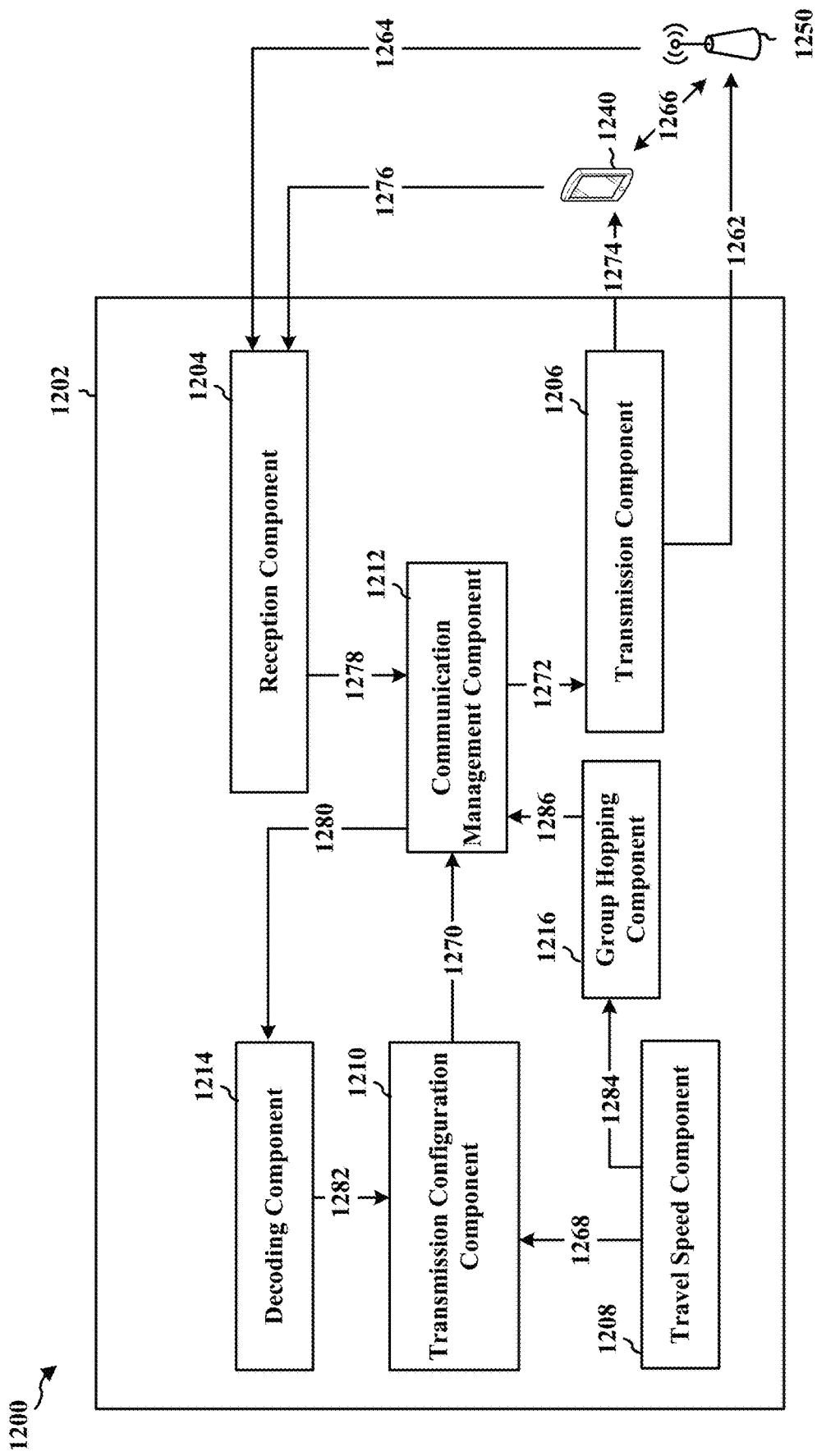
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204, a transmission component 1206, and a travel speed component 1208, a transmission configuration component 1210, a communication management component 1212, a decoding component 1214, and a group hopping component 1216. The apparatus 1202 and a second UE 1240 may be connected to a base station 1250 at 1262, 1264, and 1266.

According to one aspect, the apparatus 1202 may be a UE that transmits or receives communication to or from other devices (e.g., the second UE 1240). In this aspect, the travel speed component 1208 may determine a travel speed of the apparatus 1202. The travel speed component 1208 may convey information about the travel speed to the transmission configuration component 1210, at 1268. The travel speed component 1208 may convey information about the travel speed to the group hopping component 1216, at 1284. In an aspect, the travel speed may be determined based on at least one of the travel speed of the apparatus 1202 or the maximum travel speed corresponding to a location of the apparatus 1202. In an aspect, the travel speed component 1208 may determine the maximum travel speed corresponding to the location of the apparatus 1202 by: determining a location of the apparatus 1202, and determining the maximum travel speed corresponding to the location of the apparatus 1202. In an aspect, the maximum travel speed corresponding to the location of the apparatus 1202 may be the speed limit of an area corresponding to the location of the apparatus 1202. In an aspect, travel speed may be further determined based on the travel speed of a receiving UE (e.g., the UE 1240).

The transmission configuration component 1210 may determine, based on the travel speed of the UE, a transmission configuration of the apparatus 1202 for device-to-device communication. The device-to-device communication may be over a licensed or unlicensed spectrum. The transmission configuration component 1210 may convey information about the transmission configuration to the communication management component 1212, at 1270. In an aspect, the transmission configuration may include at least one of an MCS, the number of resource blocks used for transmission, and the number of retransmissions. In an aspect, association information of the travel speed and a corresponding transmission configuration may be preconfigured or may be received from a base station (e.g., the base station 1250).

In an aspect, when the travel speed of the apparatus 1202 increases (e.g., according to the travel speed component 1208), the transmission configuration component 1210 may adjust the transmission configuration of the UE by performing at least one of: increasing a number of resource blocks used for transmission, decreasing a modulation and coding scheme (MCS) value, or increasing a number of retransmissions. In an aspect, when the travel speed of the UE decreases (e.g., according to the travel speed component 1208), the transmission configuration component 1210 may adjust the transmission configuration of the UE by performing at least one of: decreasing a number of resource blocks used for transmission, increasing an MCS value, or decreasing a number of retransmissions.

The group hopping component 1216 enables or disables, based on the travel speed of the UE, group hopping for DM-RS symbols within a control channel for device-to-device communication. The group hopping component 1216 may convey information about the group hopping to the communication management component 1212, at 1286. In an aspect, the enabling/disabling of group hopping may be preconfigured or may be received from a base station (e.g., the base station 1250).

In an aspect, when the travel speed of the UE increases (e.g., according to the travel speed component 1208), the group hopping component 1216 may enable group hopping. In an aspect, when the travel speed of the UE decreases (e.g., according to the travel speed component 1208), the group hopping component 1216 may disable group hopping.

The communication management component 1212 may transmit, via the transmission component 1206, the device-to-device communication based on the transmission configuration (e.g., to a second UE 1240) and/or the group hopping configuration (e.g., enabled or disabled), at 1272 and 1274.

In an aspect, the communication management component 1212 may transmit, via the transmission component 1206, the device-to-device communication by transmitting an SA based on an SA transmission configuration, and may transmit the data via a data channel based on a data transmission configuration. In such an aspect, the SA may indicate the data transmission configuration and a location of resources for the data channel.

In an aspect, the communication management component 1212 may transmit, via the transmission component 1206, the device-to-device communication by: transmitting the SA on any one of a plurality of sets of SA resources if the communication management component 1212 determines to utilize a fixed SA transmission configuration, and transmitting the SA on a corresponding set of SA resources other than a first set of SA resources if the communication management component 1212 determines to vary the SA transmission configuration of the UE based on the travel speed of the UE. The SA resources may be divided into the plurality of sets of SA resources based on types of SA transmission configurations. In such an aspect, the first set of SA resources may be associated with the fixed SA transmission configuration, and each of other sets of SA resources may be associated with a corresponding type of SA transmission configuration and the fixed SA transmission configuration. In such an aspect, the size of each set of SA resources and at least one type of SA transmission configuration for each set of SA resources may be associated with a corresponding travel speed of the UE. In such an aspect, at least one of the size of each set of SA resources or the at least one type of SA transmission configuration for each set of SA resources may be preconfigured or may be received from a base station (e.g., base station 1250).

According to one aspect, the apparatus 1202 may be a receiving UE that receives communication from a transmitting UE. In this aspect, the communication management component 1212 may receive, via the reception component 1204, communication from a transmitting UE (e.g., second UE 1240) via device-to-device communication, at 1276 and 1278.

The communication management component 1212 may determine a corresponding set of SA resources used to receive the communication from the transmitting UE (e.g., second UE 1240) among a plurality of sets of SA resources. The SA resources may be divided into the plurality of sets of SA resources based on types of SA transmission configurations. The communication management component 1212 may convey information about the corresponding set of SA resources to the decoding component 1214, at 1280. In one configuration, the communication management component 1212 may perform channel estimation based on the DM-RS sequences received from the group hopping component 1216.

The decoding component 1214 decodes an SA based on the communication within the corresponding set of SA resources. The decoding component 1214 may convey information about the SA to the transmission configuration component 1210, at 1282.

In an aspect, the decoding component 1214 may decode the SA by blind decoding within the corresponding set of SA resources to decode the SA indicating the data transmission configuration.

In an aspect, the decoding component 1214 may decode the SA by decoding for an SA based on a fixed SA configuration if the corresponding set of SA resources is a first set of SA resources, and decoding for an SA based on the fixed SA configuration or an SA based on an SA transmission configuration corresponding to the corresponding set of SA resources if the corresponding set of SA resources is a set of SA resources different from the first set.

The transmission configuration component 1210 may determine a data transmission configuration based on the SA within the corresponding set of SA resources. The transmission configuration component 1210 may convey information about the data transmission configuration to the communication management component 1212, at 1970.

The communication management component 1212 may receive, via the reception component 1204, data from the transmitting UE (e.g., second UE 1240) based on the data transmission configuration, at 1276 and 1278.

In an aspect, the data transmission configuration may include at least one of an MCS, a number of resource blocks used for transmission, and a number of retransmissions.

In an aspect, the communication management component 1212 may receive the data (e.g., from the second UE 1240) by determining a location of resources for the data channel based on the SA, and receiving the data based on the location of resources for the data channel and the data transmission configuration.

In an aspect, the size of each set of SA resources and at least one type of SA transmission configuration for each set of SA resources may be associated with a corresponding travel speed of the transmitting UE (e.g., second UE 1240). In such an aspect, at least one of the size of each set of SA resources or the at least one type of SA transmission configuration for each set of SA resources may be preconfigured or may be received from a base station.

The apparatus may include additional components that perform each of the blocks of the algorithm in the aforementioned flowcharts of FIGS. 8, 9, and 11. As such, each block in the aforementioned flowcharts of FIGS. 8, 9, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
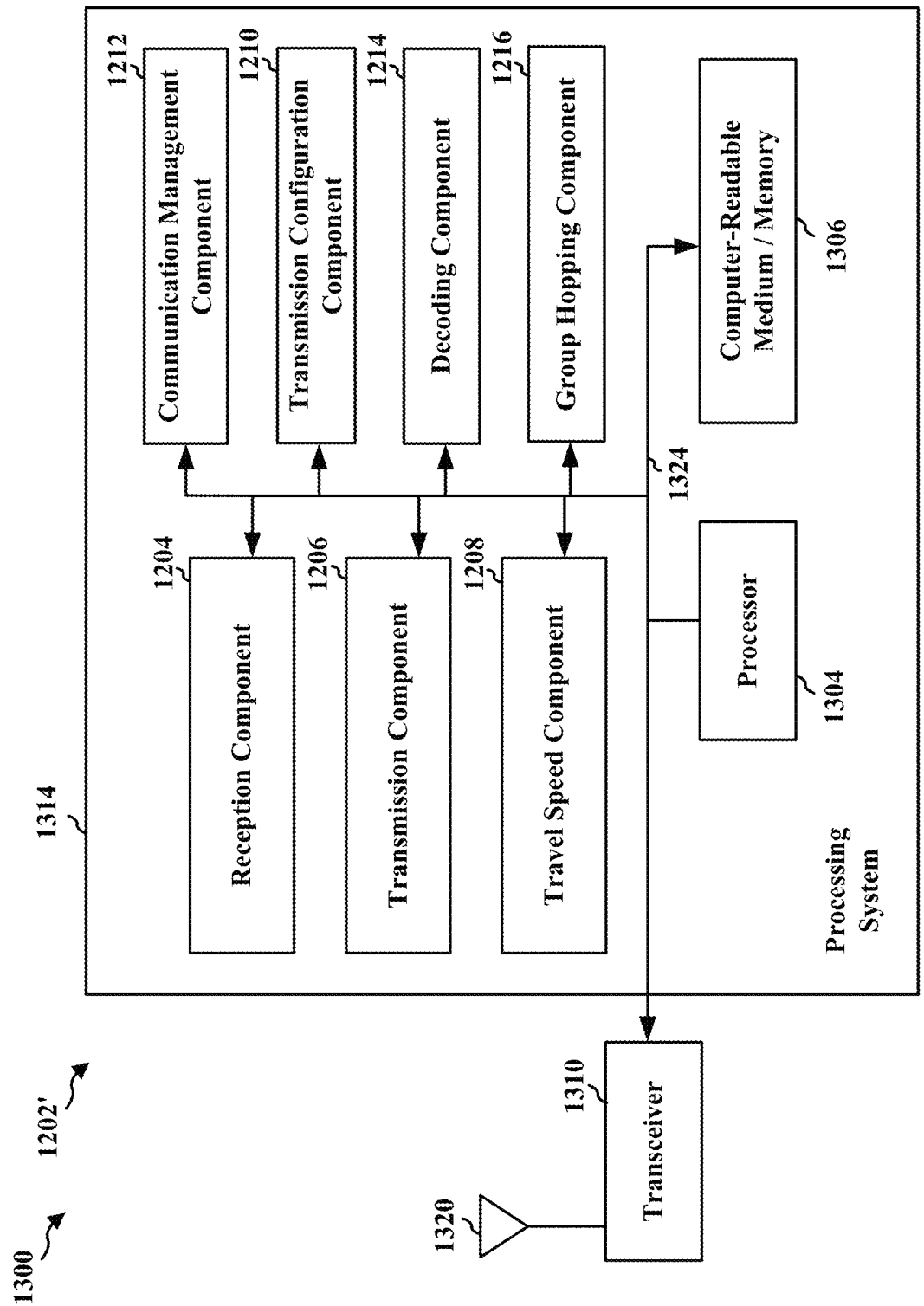
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means for determining a travel speed of the UE, means for determining, based on the travel speed of the UE, a transmission configuration of the UE for device-to-device communication, and means for transmitting the device-to-device communication based on the transmission configuration. In an aspect, when the travel speed of the UE increases, the means for determining may be configured to perform at least one of: increasing a number of resource blocks used for transmission, decreasing an MCS value, or increasing a number of retransmissions. In an aspect, when the travel speed of the UE decreases, the means for determining may be configured to perform at least one of: decreasing a number of resource blocks used for transmission, increasing an MCS value, or decreasing a number of retransmissions. In an aspect, the means for transmitting of the device-to-device communication may be configured to: transmit an SA based on an SA transmission configuration, and transmit the data via a data channel based on a data transmission configuration. In an aspect, the means for transmitting of the device-to-device communication may be configured to: transmit the SA on any one of a plurality of sets of SA resources if the UE determines to utilize a fixed SA transmission configuration, and transmit the SA on a corresponding set of SA resources other than a first set of SA resources if the UE determines to vary the SA transmission configuration of the UE based on the travel speed of the UE, where the SA resources are divided into the plurality of sets of SA resources based on types of SA transmission configurations.

In another configuration, the apparatus 1202/1202' for wireless communication may include means for receiving communication from a transmitting UE via device-to-device communication, means for determining a corresponding set of SA resources used to receive the communication from the transmitting UE among a plurality of sets of SA resources, where the SA resources are divided into the plurality of sets of SA resources based on types of SA transmission configurations, means for decoding an SA based on the communication within the corresponding set of SA resources, means for determining a data transmission configuration based on the SA within the corresponding set of SA resources, and means for receiving data from the transmitting UE based on the data transmission configuration. In an aspect, the means for decoding the SA may be configured to perform blind decoding within the corresponding set of SA resources to decode the SA indicating the data transmission configuration. In an aspect, the means for decoding the SA may be configured to: decode for an SA based on a fixed SA configuration if the corresponding set of SA resources is a first set of SA resources, and decode for an SA based on the fixed SA configuration or an SA based on an SA transmission configuration corresponding to the corresponding set of SA resources if the corresponding set of SA resources is a set of SA resources different from the first set. In an aspect, the means for receiving the data may be configured to: determine a location of resources for the data channel based on the SA, and receive the data based on the location of resources for the data channel and the data transmission configuration.

In one configuration, the apparatus 1202/1202' for wireless communication may include means for determining to enable group hopping for a plurality of DM-RS sequences associated with a control channel for device-to-device communication, means for determining the plurality of DM-RS sequences by applying a group hopping pattern to the plurality of DM-RS symbols, and means for transmitting or receiving scheduling assignment for the device-to-device communication with the plurality of DM-RS sequences. In one configuration, the means for determining to enable group hopping may be configured to operate based on one or more of a travel speed of the apparatus, a pre-configuration, or an eNB signaling. In one configuration, to apply the group hopping pattern to the plurality of DM-RS symbols, the means for determining the plurality of DM-RS sequences may be configured to change root indices of the Zadoff-Chu sequences used for different DM-RS symbols.

In one configuration, the apparatus 1202/1202' may include means for determining a second plurality of DM-RS sequences associated with a data channel for the device-to-device communication by applying a second group hopping pattern to a second plurality of DM-RS symbols within the data channel of the subframe. In one configuration, to apply the second group hopping pattern to the second plurality of DM-RS symbols, the means for determining a second plurality of DM-RS sequences may be configured to change root indices of the Zadoff-Chu sequences used for different DM-RS symbols.

In one configuration, the apparatus 1202/1202' may include means for transmitting or receiving data for the device-to-device communication with the second plurality of DM-RS sequences.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a user equipment (UE), comprising:
    determining a location of the UE;
    determining a maximum travel speed of a region corresponding to the location of the UE based on a speed limit of the region;
    determining a travel speed of the UE based on the maximum travel speed;
    determining, by the UE, based on the travel speed of the UE, a transmission configuration of the UE for device-to-device communication; and
    transmitting the device-to-device communication on the transmission configuration, wherein transmitting the device-to-device communication comprises transmitting a scheduling assignment (SA) based on an SA transmission configuration, wherein the SA is transmitted on a corresponding set of SA resources other than a first set of SA resources in response to the UE determining to vary the SA transmission configuration of the UE based on the travel speed of the UE,
    wherein SA resources are divided into a plurality of sets of SA resources based on types of SA transmission configurations.

2. The method of claim 1, wherein the transmission configuration includes at least one of a modulation and coding scheme (MCS), a number of resource blocks used for transmission, and a number of retransmissions.

3. The method of claim 2, wherein, when the travel speed of the UE increases, the determining comprises at least one of:
    increasing a number of resource blocks used for transmission;
    decreasing a modulation and coding scheme (MCS) value; or increasing a number of retransmissions.

4. The method of claim 2, wherein, when the travel speed of the UE decreases, the determining comprises at least one of:
    decreasing a number of resource blocks used for transmission;
    increasing a modulation and coding scheme (MCS) value; or
    decreasing a number of retransmissions.

5. The method of claim 1, wherein the maximum travel speed of the location of the UE is a speed limit of an area corresponding to the location of the UE.

6. The method of claim 1, wherein the travel speed of the UE is further determined based on a travel speed of a receiving UE.

7. The method of claim 1, wherein the transmission configuration is determined based on association information of the travel speed and a corresponding transmission configuration, and wherein the association information is preconfigured or is received from a base station.

8. The method of claim 1, wherein the transmitting of the device-to-device communication comprises:
    transmitting data via a data channel based on a data transmission configuration.

9. The method of claim 1, wherein the SA indicates the data transmission configuration and a location of resources for the data channel.

10. The method of claim 1 wherein the transmitting of the device-to-device communication comprises:
    transmitting the SA on any one of the plurality of sets of SA resources in response to the UE determining to utilize a fixed SA transmission configuration.

11. The method of claim 10, wherein the first set of SA resources is associated with the fixed SA transmission configuration, and
    wherein each of other sets of SA resources is associated with a corresponding type of SA transmission configuration and the fixed SA transmission configuration.

12. The method of claim 10, wherein a size of each set of SA resources and at least one type of SA transmission configuration for each set of SA resources are associated with a corresponding travel speed of the UE.

13. The method of claim 12, wherein at least one of the size of each set of SA resources or the at least one type of SA transmission configuration for each set of SA resources is preconfigured or is received from a base station.

14. A user equipment (UE) for wireless communication, comprising:
    means for determining a location of the UE;
    means for determining a maximum travel speed of a region corresponding to the location of the UE based on a speed limit of the region;

means for determining a travel speed of the UE based on the maximum travel speed;

means for determining, via the UE, based on the travel speed of the UE, a transmission configuration of the UE for device-to-device communication; and means for transmitting the device-to-device communication based on the transmission configuration, wherein the means for transmitting the device-to-device communication is configured to transmit a scheduling assignment (SA) based on an SA transmission configuration, wherein the SA is transmitted on a corresponding set of SA resources other than a first set of SA resources in response to the UE determining to vary the SA transmission configuration of the UE based on the travel speed of the UE, wherein SA resources are divided into a plurality of sets of SA resources based on types of SA transmission configurations.

15. The UE of claim 14, wherein the transmission configuration includes at least one of a modulation and coding scheme (MCS), a number of resource blocks used for transmission, and a number of retransmissions.

16. The UE of claim 15, wherein, when the travel speed of the UE increases, the means for determining is configured to perform at least one of:
increasing a number of resource blocks used for transmission;
decreasing a modulation and coding scheme (MCS) value; or
increasing a number of retransmissions.

17. The UE of claim 15, wherein, when the travel speed of the UE decreases, the means for determining is configured to perform at least one of:
decreasing a number of resource blocks used for transmission;
increasing a modulation and coding scheme (MCS) value; or
decreasing a number of retransmissions.

18. The UE of claim 14, wherein the maximum travel speed of the location of the UE is a speed limit of an area corresponding to the location of the UE.

19. The UE of claim 14, wherein travel speed is further determined based on a travel speed of a receiving UE.

20. The UE of claim 14, wherein the transmission configuration is determined based on association information of the travel speed and a corresponding transmission configuration, and wherein the association information is preconfigured or is received from a base station.

21. The UE of claim 14, wherein the means for transmitting of the device-to-device communication is configured to:
transmit data via a data channel based on a data transmission configuration.

22. The UE of claim 14, wherein the SA indicates the data transmission configuration and a location of resources for the data channel.

23. The UE of claim 14, wherein the means for transmitting the device-to-device communication is configured to:
transmit the SA on any one of the plurality of sets of SA resources in response to the UE determining to utilize a fixed SA transmission configuration.

24. The UE of claim 23, wherein the first set of SA resources is associated with the fixed SA transmission configuration, and
wherein each of other sets of SA resources is associated with a corresponding type of SA transmission configuration and the fixed SA transmission configuration.

25. The UE of claim 23, wherein a size of each set of SA resources and at least one type of SA transmission configuration for each set of SA resources are associated with a corresponding travel speed of the UE.

26. The UE of claim 25, wherein at least one of the size of each set of SA resources or the at least one type of SA transmission configuration for each set of SA resources is preconfigured or is received from a base station.

27. A user equipment (UE) for wireless communication, comprising:
a memory; and
at least one processor coupled to the memory and configured to:
determine a location of the UE;
determine a maximum travel speed of a region corresponding to the location of the UE based on a speed limit of the region;
determine a travel speed of the UE based on the maximum travel speed;
determine, by the UE, based on the travel speed of the UE, a transmission configuration of the UE for device-to-device communication; and
transmit the device-to-device communication based on the transmission configuration, wherein the transmission of the device-to-device communication comprises transmission of a scheduling assignment (SA) based on an SA transmission configuration, wherein the SA is transmitted on a corresponding set of SA resources other than a first set of SA resources if the UE determines to vary the SA transmission configuration of the UE based on the travel speed of the UE,
wherein SA resources are divided into a plurality of sets of SA resources based on types of SA transmission configurations.

28. The UE of claim 27, wherein the transmission configuration includes at least one of a modulation and coding scheme (MCS), a number of resource blocks used for transmission, and a number of retransmissions.

29. The UE of claim 28, wherein, when the travel speed of the UE increases, the at least one processor configured to set the transmission configuration is configured to perform at least one of:
increasing a number of resource blocks used for transmission;
decreasing a modulation and coding scheme (MCS) value; or
increasing a number of retransmissions.

30. The UE of claim 2, wherein, when the travel speed of the UE decreases, to determine the transmission configuration, the at least one processor is configured to perform at least one of:
decreasing a number of resource blocks used for transmission;
increasing a modulation and coding scheme (MCS) value; or
decreasing a number of retransmissions.

31. The UE of claim 27, wherein the maximum travel speed of the location of the UE is a speed limit of an area corresponding to the location of the UE.

32. The UE of claim 27, wherein travel speed is further determined based on a travel speed of a receiving UE.

33. The UE of claim 27, wherein the transmission configuration is determined based on association information of the travel speed and a corresponding transmission configuration, and wherein the association information is preconfigured or is received from a base station.

34. The UE of claim 27, wherein the at least one processor configured to transmit the device-to-device communication is configured to:
   transmit data via a data channel based on a data transmission configuration.

35. The UE of claim 27, wherein the SA indicates the data transmission configuration and a location of resources for the data channel.

36. The UE of claim 27, wherein the at least one processor configured to transmit the device-to-device communication is configured to:
   transmit the SA on any one of the plurality of sets of SA resources if the UE determines to utilize a fixed SA transmission configuration.

37. The UE of claim 36, wherein the first set of SA resources is associated with the fixed SA transmission configuration, and
   wherein each of other sets of SA resources is associated with a corresponding type of SA transmission configuration and the fixed SA transmission configuration.

38. The UE of claim 36, wherein a size of each set of SA resources and at least one type of SA transmission configuration for each set of SA resources are associated with a corresponding travel speed of the UE.

39. The UE of claim 38, wherein at least one of the size of each set of SA resources or the at least one type of SA transmission configuration for each set of SA resources is preconfigured or is received from a base station.

40. A non-transitory computer-readable medium for a user equipment (UE) storing computer executable code, comprising code to:
   determine a location of the UE;
   determine a maximum travel speed of a region corresponding to the location of the UE based on a speed limit of the region;
   determine a travel speed of the UE based on the maximum travel speed;
   determine, by the UE, based on the travel speed of the UE, a transmission configuration of the UE for device-to-device communication; and
   transmit the device-to-device communication based on the transmission configuration, wherein the transmission of the device-to-device communication comprises transmission of a scheduling assignment (SA) based on an SA transmission configuration, wherein the SA is transmitted on a corresponding set of SA resources other than a first set of SA resources when the UE determines to vary the SA transmission configuration of the UE based on the travel speed of the UE,
   wherein SA resources are divided into a plurality of sets of SA resources based on types of SA transmission configurations.

* * * * *